United States Patent [19]

Moore et al.

[11] Patent Number: 4,813,614

[45] Date of Patent: Mar. 21, 1989

[54] METHOD AND APPARATUS FOR TREATING WASTE PRODUCTS TO RECOVER THE COMPONENTS THEREOF

[76] Inventors: David R. Moore, P.O. Box 672, Ganado, Tex. 77962; Curry L. Aten, 123 McCormick Dr., Victoria, Tex. 77904

[21] Appl. No.: 83,722

[22] Filed: Aug. 10, 1987

[51] Int. Cl.⁴ .............................................. B02C 21/02
[52] U.S. Cl. .................................... 241/23; 241/24; 241/65; 241/79.1; 241/101.7; 241/DIG. 31; 241/DIG. 37
[58] Field of Search ............... 241/DIG. 31, DIG. 37, 241/DIG. 38, 23, 24, 65, 29, 77, 78, 236, 79.1, 243, 19, 223, 101.7

[56] References Cited

U.S. PATENT DOCUMENTS

| | | |
|---|---|---|
| 2,609,150 | 11/1949 | Bludeau . |
| 2,836,368 | 5/1958 | McCoy . |
| 3,718,284 | 2/1973 | Richardson . |
| 3,885,744 | 5/1978 | Drage . |
| 3,995,816 | 12/1976 | Motek . |
| 4,025,990 | 5/1977 | Lovette . |
| 4,073,443 | 2/1978 | Danioni . |
| 4,084,387 | 4/1978 | Schorach et al. . |
| 4,240,587 | 12/1980 | Letsch .................... 241/DIG. 37 X |
| 4,417,697 | 11/1983 | Saiki et al. ...................... 241/223 X |

FOREIGN PATENT DOCUMENTS

| | | |
|---|---|---|
| 2432615 | 1/1976 | Fed. Rep. of Germany ... 241/DIG. 37 |
| 15750 | 5/1978 | Japan .......................... 241/DIG. 37 |

*Primary Examiner*—Mark Rosenbaum
*Attorney, Agent, or Firm*—Russell J. Egan

[57] ABSTRACT

Used products, which would otherwise be disposed of as waste, are subjected to low temperature lowering the temperature of the product to approximately the temperature of crystallization of the components thereof. The product at this lowered temperature is then crushed sufficiently to cause the components thereof to release sufficiently to be subsequently separated according to material. The separation steps can include subjecting the crushed material to magnetic or electrostatic fields, air flows caused by either pressurized air or vacuums, and mechanical separation with vibratory screens and rakes. The materials of the original product are sufficiently separated to enable them to be recycled into usable product. The particular example cited relates to vehicle tires with the materials recovered including rubber, fiber and metal bands.

32 Claims, 2 Drawing Sheets

METHOD AND APPARATUS FOR TREATING WASTE PRODUCTS TO RECOVER THE COMPONENTS THEREOF

BACKGROUND OF THE INVENTION

1. The Field of the Invention

The present invention pertains to a method and apparatus for treating waste materials to recover the components thereof, and in particular to a method and apparatus which freezes the waste material, crushes it while in a frozen state, and separates the individual materials.

2. The Prior Art

The traditional method for handling waste materials has been to simply dump the waste on designated land areas thereby creating large and often hazardous dumps in which fires are frequent and runoff into water sources is routine. Not only are these dumps eyesores, they are environmental hazards to both the air and water. It is of no little consequence that while dumps or land fills have often been the cheapest short term way of handling waste material, the land which can be used for this purpose is rapidly running out. This is particularly true in the highly urbanized areas of the industrialized countries. This traditional method of disposing of waste does not allow for the recovery of materials thereby making some of these dumps and landfills potential mines of materials. This is a particular loss when materials, such as aluminum, are considered since many such materials can be recycled if they can be separated from other materials forming the original product.

A particular problem is found in the disposal of rubber based products, such as automotive tires, hoses and belts, all of which are comprised of natural or synthetic rubber reinforced with other materials such as metal belts and fiberous cords. These products have very little use after they have performed their original and/or primary task and therefor are generally discarded. It is acknowledged that a certain number of tires are used to build retaining walls, guards protecting boating and similar things where resistance to weathering is desirable. However, a far greater number of tires, belts and hoses are simply discarded to become eyesores and breeding grounds for insects and other pests. Burying is particularly ineffective with these materials since they resist decomposition and tend to work their way to the surface.

There have been many proposals for handling waste materials so as to recover the component products. Some of these included burning off the unwanted material to get at the fire resistant residues or metal substructure. While this may seem to be an answer, it ignores the fact that much useful material would be consumed in burning, that the incineration process itself would not be energy efficient and could release hazardous by-products into the atmosphere. This also ignores the problem of what to do with the ash residues.

Other approaches to material recovery have included rendering the waste material into smaller pieces and then forcably removing the desirable components. This may be a very difficult task when one considers recovery of materials from something such as a tire, which is produced to withstand much abuse without loss of function. Even rendering a tire into smaller pieces would still not enhance the recovery of the metal, fiber, and rubber products thereof. Besides, a great amount of energy would be consumed in rendering the tire into the smaller pieces.

Still other approaches have involved the use of chemicals to break down the materials into their components. However, these methods create chemical sludges and residues which are not only a nuisance (if not impossible) to dispose of, but some chemical treatments are dangerous to both human life and the environment.

There have been a number of attempts to improve on the above discussed techniques by freezing and treating waste material. U.S. Pat. No. 2,609,150 teaches precooling thermal plastic resins and then driving the material at high velocity to shatter upon impact with a barrier. U.S. Pat. No. 3,718,284 relates specifically to automobile tires and includes a pretreating step which punctures holes in the tire in order to assure drainage of the liquid refrigerant. The puncturing step would demand a large energy expenditure. U.S. Pat. No. 2,836,368 relates to treating food products which have a large liquid content of their own. The product is frozen by a stream of gas and the frozen material is pulverized. U.S. Pat. No. 3,885,744 describes an apparatus which sequentially freezes, crushes, and separates material. The separating steps are specified as including magnetic means. U.S. Pat. No. 3,995,816 also relates to automobile tires. According to this patent, the tires are frozen and dropped onto a rotor to be crushed sufficiently to pass on through the apparatus. U.S. Pat. No. 4,025,990 differs from the previously discussed patents in that it discloses having at least two separate freezing zones. U.S. Pat. No. 4,073,443 discloses an apparatus which clearly is batch operated rather than continuously operated. U.S. Pat. No. 4,084,387 discloses an apparatus in which a helix within a drum is utilized to move the product forward.

The present invention intends to overcome all of the above difficulties.

SUMMARY OF THE INVENTION

The present invention is a method and apparatus for recovering component products from waste materials. In particular, the method includes the steps of moving the waste material, in unreduced form, continuously through a chamber where it is subjected to freezing temperatures, for example by showers of liquid nitrogen, reducing the temperature of the material to at least its crystalization temperature. The frozen product is then broken down by at least one crushing station causing an initial separation of the components. The crushing station can be formed by rollers which either mesh or which press the material against a backup plate. As soon as the individual components can be separated from the main stream of material by mechanical, electrical, or magnetic means, they are separated with the remainder of the product being subjected to further crushing while still in the frozen state. The various component products can be separated during the process by any of the well known means, such as rakes or sieves, vacuum or forced air flow, magnetic fields, or charged fields.

The apparatus for performing the subject invention includes a chamber having means to convey waste material therethrough in a continuous manner. Preferably the waste material is conveyed along a tortious route within the chamber to have a long path of travel within a short space defined by the chamber thereby making the most economical use of the coolant, preferable liquid nitrogen. The liquid nitrogen is supplied to the chamber in such manner as to allow full flow over the waste materials and recovery of the nitrogen gas. At least one crushing station is included to receive the product while in the frozen state and crush it causing the components to initially separate. Subsequent crushing stations can be used to reduce the material to the desired degree, even to a powder if that is desirable. Along with or in between the crushing stations there will be electrical and/or mechanical separating means, such as magnets and rakes or sieves.

The method and apparatus of the present invention overcome many of the problems of the prior art and yield component products which are fit for recycling without a great deal of further effort.

BRIEF DESCRIPTION OF THE DRAWINGS

The present invention will now be described, by way of example, with reference to the accompanying drawings, in which.

DETAILED DESCRIPTION OF THE PREFERRED EMBODIMENT

Figure 1:
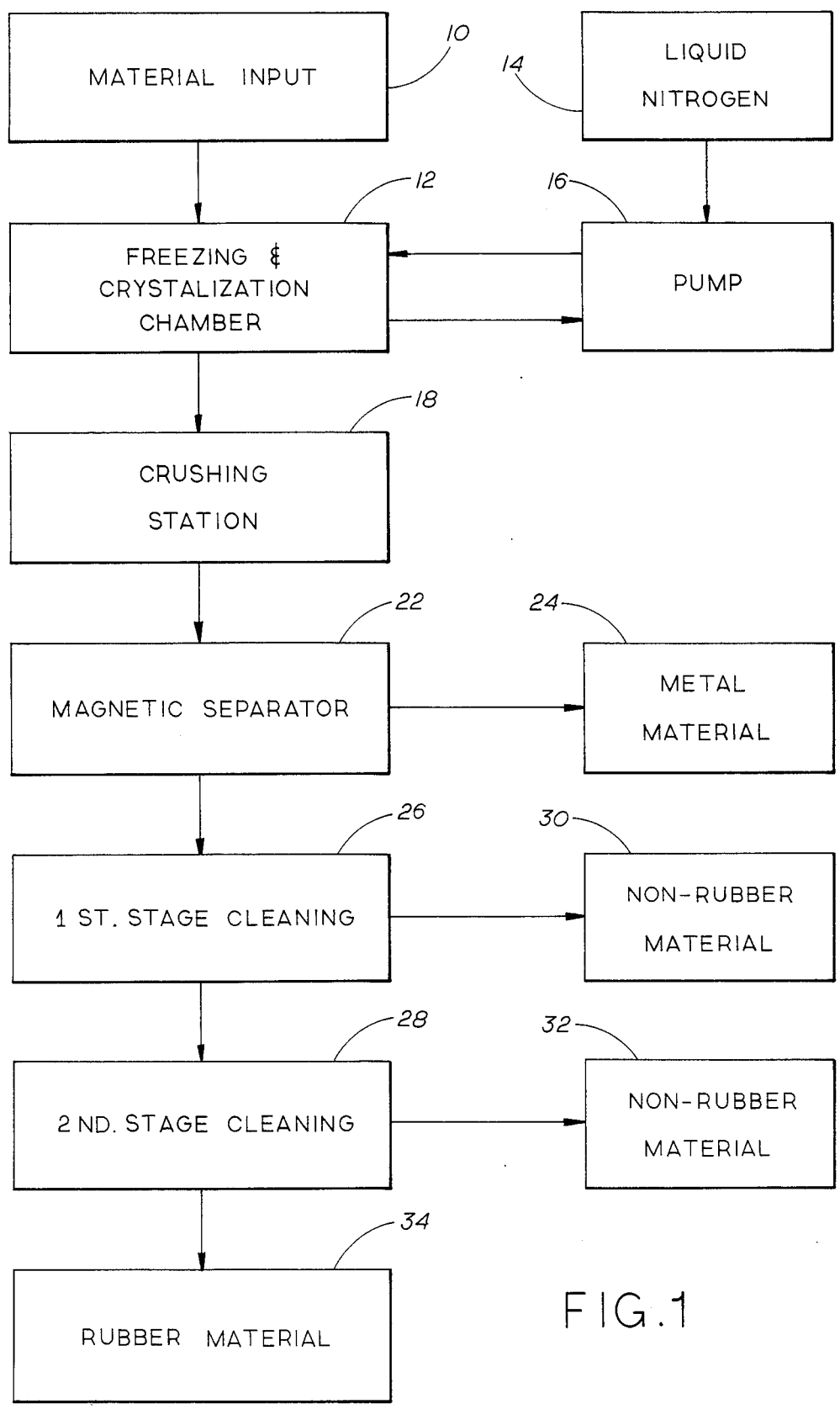
FIG. 1 is a block level schematic showing the method of the present invention.

The present invention is shown in a block level schematic in FIG. 1. The material to be processed is placed in an input feed means 10 and sent to a freezing chamber 12 where it is subjected to temperatures low enough to lower the temperature of the material to its crystalization temperature. This step can advantageously be carried out by circulating liquid coolant, such as liquid nitrogen, through the chamber from a storage container 14 by means of a recirculating pump 16. The liquid coolant system should also include means for recovering the liquid coolant as it boils off and recycling it. The product at its crystalization state is then sent to crushing means 18. There are many well know crushing means that can be used. For example, a simple set of rollers arranged to engage opposite sides of the material and apply crushing pressure as the material passes therebetween. Alternatives to this would include rollers with meshing profiles. It would also be likely to have a series of rollers which progressively crush the material into finer and finer particles.

The crushed frozen material is then passed through a series of separation stations, such as a magnetic separator 22 with magnetic material being diverted to 24. The crushed material, less the magnetic components, is then passed through a series of cleaning stations 26,28 where non rubber material 30,32, such as fiber cords or webs, is removed leaving only rubber material 34. The cleaning stations can be selected from a wide variety of types including, but not restricted to, vibrating or shaking tables, air flows caused by either pressurized air or vacuums, rakes, sieves, electrostatic devices, dust traps, etc.

Figure 2:
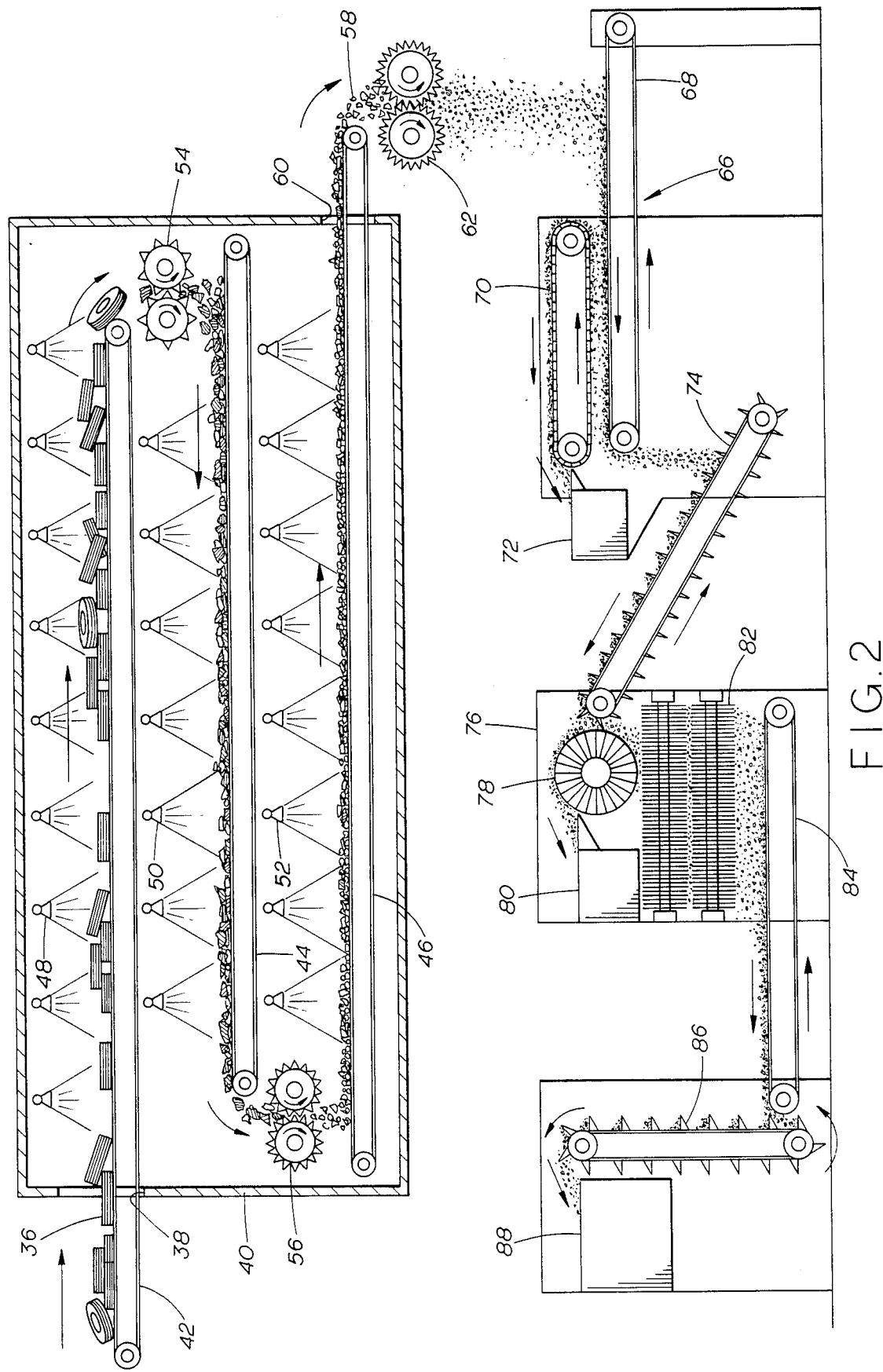
FIG. 2 is a side elevation, partly in section, through an apparatus according to the present invention.

A somewhat more detailed representative example is shown in FIG. 2. This example is showing used automotive tires being reduced to the basic components of metal bands, fiber cords, and rubber material. The tires 36 are fed to the entry port 38 of freezing chamber 40 by a first conveyor 42. It will be understood that this conveyor, and the other conveyors located within the chamber 40, will have to be made from materials capable of withstanding the low temperatures within the chamber without breaking down. The chamber 40 is shown with a series of three conveyors 42, 44, 46 forming a tortious path through the chamber. This configuration is only representative but has the advantage of keeping to a minimum chamber size with the maximum exposure of the material to the freezing temperatures so that there will be complete crystalization of the material. A series of nozzles 48, 50, 52 are shown disposed over each respective conveyor and directed toward the upper surface thereof. This arrangement is also merely representative and many different arrays of nozzles can be used according to the materials being processed and the processing speed.

First and second crushing stations 54, 56 are shown within the chamber 40. These crushing stations are shown as pairs of interengaging profiled rollers and would serve to initially crush the tires allowing a more complete freezing to crystalization of the tire components, particularly the rubber material. The stream of crushed crystalized material 58 exits the chamber 40 at port 60 and falls by gravity between two further crushing rollers 62,64. These rollers further reduce the tire material to almost a powder form which is deposited on a metal separation table 66 here represented by opposetely moving parallel conveyors 68, 70. Conveyor 68 receives the powdered material 58 and moves it beneath conveyor 70 which is charged or magnetized to attrach the metallic components of the material 58. It is recognized that only magnetizable metals will be removed at this point and that another means must be utilized to remove the non-magnetic metals. In the case shown, the magnetic metals, such as the steel bands found in radial tires, are removed by conveyor 70 and deposited in a receptacle 72. The remaining material is dropped onto a conveyor 74 and transported to a mechanical separation station where combs or rakes 78 remove cord or string like material and deposit it in container 80. This station can also include shaker or vibratory tables which can serve to separate materials by size leaving only the most pulverized material to be received by conveyor 84 and transferred to conveyor to be placed into storage 88.

It will be appreciated that this apparatus will reduce the used tires 36 to the basic components of the metal bands at 72, the cords at 80, and the rubber material at 88. Each of these three components is basicly in condition for recycling at this point. If necessary the rubber material can be further reduced by crushing, although this is considered to be unlikely. The rubber material can be recycled into new tires or into any of the many byproducts of recycled rubber, including road surfaces.

Both of the figures are merely representative of the present invention. The length of the chamber 40 and the number of conveyors contained therein as well as the number of internal crushing stations would all be factors that would have to be determined by the intended capacity of the apparatus and, to some extent, by the locale where it is to operate. The chamber 40 would, of course, be insulated, but the insulation factors would be largely determined by local conditions. The number and positioning of the spray nozzles would have to be determined by the intended processing rates and the material being processed.

As a specific example, belts travelling at a rate of 1 foot per second would have to be 15 feet (4.5 meters) long as the best results are achieved when the product (tires) is exposed to the liquid coolant (liquid nitrogen) for at least 15 seconds. Longer exposure tends to waste the liquid coolant without achieving any tangible results. Lesser exposure generally requires the use of more crushers in order to assure that the material is crystallized all the way through.

The preferred coolant is liquid nitrogen which has a temperature of −273° F. (−169.5° C.) and a boil off point of −232.8°0 F. (−147° C.). The preferred temperature range is −250° to −300° F. (−156.6° to −182.4° C.). It may be necessary to use colder temperatures when the system is started up as the chamber itself will initially require a lot of cooling. When the system stabilizes, the temperatures can be raised to a working temperature. Other liquified gases could be used in place of the discussed liquid nitrogen if desired. In any case, the chamber would be designed in the manner of any cooling chamber and have sufficient insulation for efficient operation. Likewise, the size of the chamber would be dependent upon the product being treated and the anticipated operational rates. The entry and exit ports would be provided with traps to prevent excessive waste of the coolant gas, which would preferably be recovered as it warms and is recycled. Portable plants as well as large fixed installations would be possible.

There are many types of conveyors which can be used in the present invention. For example, the drag or apron conveyors manufactured by Webb-Materials Handling Equipment of Chicago, ILL. would serve most purposes of the present invention. However, other similar well known conveyors and conveying systems can be utilized in the present invention with great benefit. The selection of an appropriate system would be a routine engineering decision.

The present invention has been illustrated and described in connection with recovery of the components forming a vehicle tire or similar product, such as a drive belt or hose for a vehicle which basically is a reinforced rubber product. It should be specifically noted that the subject method and apparatus are suitable for use in recovering many other types of material from used products without departing from the spirit or essential characteristics of the present invention. The temperatures involved in recovery of other materials would, of course, depend upon the characteristics of the material composition. A primary teaching of the present invention is that the product to be recovered must first be reduced in temperature to the point of crystalization of the materials so that when pressure is applied to the cooled or "frozen" product, it will shatter destroying the original structure sufficiently to allow recovery of the individual materials of the product. It bears repeating that times and temperatures will vary with the composition of the product being treated. Therefore the present specification is intended in all respects as being illustrative and not restrictive of the scope of the invention.

We claim:

1. An apparatus for reclaiming components of used products, said apparatus comprising:
   a substantially closed chamber having an inlet port and an exit port, means to convey said products along a tortious path through said chamber from said entry port to said exit port including a plurality of conveyors forming said tortious path whereby the overall dimensions in the chamber can be kept to a minimum while maintaining a long path of travel of product through said chamber, and means to reduce the temperature of said products while on said path in said chamber to at least their temperature of crystalization to assure complete reduction of temperature of the product:
   means to crush said products while in their reduced temperature state; and
   at least one separating station receiving said crushed product to separate the components forming said product.

2. An apparatus according to claim 1 wherein said apparatus is portable.

3. An apparatus according to claim 1 wherein said means to reduce the temperature comprises:
   a source of liquid gas and means to introduce said gas to said chamber and recover the gas after it has warmed.

4. An apparatus according to claim 3 wherein said liquid gas is liquid nitrogen.

5. An apparatus according to claim 3 wherein said means to introduce said liquid gas to said chamber comprises:
   a plurality of spray heads directed toward the path of travel of said product through said chamber.

6. An apparatus according to claim 1 wherein said crushing means comprises:
   at least a pair of rollers adapted to receive said product at reduced temperature and crush it sufficiently while at said reduced temperature to destroy the original shape causing the components thereof to release for subsequent separation.

7. An apparatus according to claim 6 wherein at least one of said crushing means is located within said chamber.

8. An apparatus according to claim 6 wherein said rollers are intermeshing.

9. An apparatus according to claim 1 wherein said separating means comprises:
   magnetic means whereby magnetizable materials are removed from the crushed product.

10. An apparatus according to claim 1 wherein said separating means is electrical in nature.

11. An apparatus according to claim 1 wherein said separating means is electrostatic.

12. An apparatus according to claim 1 wherein said separating means comprises:
    means to separate the crushed product according to size.

13. An apparatus according to claim 12 wherein said separating means is a vibratory table for sorting material by size.

14. An apparatus according to claim 12 wherein said separating means comprises:
    a drag conveyor adapted to move the crushed product across a series of sieves thereby sorting the materials by size.

15. An apparatus according to claim 1 wherein said separating means comprises:
    means to direct air flow towards the crushed product to remove the lighter materials.

16. An apparatus accoring to claim 15 wherein said air flow is caused by pressurized air.

17. An apparatus according to claim 15 wherein said air flow is caused by a vacuum.

18. An apparatus accoding to claim 1 wherein said separating means comprises:
    means to remove strand-like material from said crushed product.

19. An apparatus according to claim 18 wherein said means comprises at least one rake-like member extending into the path of said crushed product.

20. An apparatus according to claim 1 further comprising gas flow restricting means at the entry and exit ports of said chamber.

21. An apparatus according to claim 1 wherein said chamber is insulated to maintain cold temperatures therein.

22. A method for recovering the materials forming a product, said method comprising the steps of:

moving said product along a tortious path within a substantially closed chamber;

lowering the temperature of said product while in said chamber to at least its temperature of crystalization as it travels along said tortious path;

at least partially crushing said product while in its lowered temperature state and while still within said chamber to substantially free the components of said product; and separating the components forming said product from said crushed product.

23. A method according to claim 22 wherein said step of lowering the temperature comprises:

introducing said product into a chamber and subjecting said product to low temperatures created by admitting liquidfied gas into said chamber.

24. A method according to claim 23 wherein said product is at least partially crushed while in said chamber.

25. A method according to claim 22 wherein said liquified gas is sprayed directly at said product for a time period sufficient to crystalize the product completely through.

26. A method according to claim 22 wherein said crushing is accomplished by passing said product between at least one pair of rollers.

27. A method according to claim 26 wherein at least some of said rollers are interfitting.

28. A method according to claim 22 wherein said separating step comprises:

passing said crushed product through a magnetic field whereby magnitizable materials are removed.

29. A method according to claim 22 wherein said separating step comprises:

subjecting said crushed materials to an electrostatic field.

30. A method according to claim 22 wherein said separating step comprises: passing the crushed material through a sizing means.

31. A method according to claim 30 wherein said sizing means is at least one vibratory seive.

32. A method according to claim 22 wherein said separating step comprises:

passing a rake-like means through said crushed material to remove therefrom string-like material having greater length than cross sectional dimensions.

* * * * *